US007784889B2

(12) United States Patent
Benner et al.

(10) Patent No.: US 7,784,889 B2
(45) Date of Patent: Aug. 31, 2010

(54) SWITCHGEAR CABINET WITH A RACK AND/OR PANEL ELEMENTS

(75) Inventors: Rolf Benner, Herborn-Amdorf (DE); Matthias Müller, Dillenburg (DE); Oskar Elm, Eschenburg (DE)

(73) Assignee: Rittal GmbH & Co. KG, Herborn (DE)

( * ) Notice: Subject to any disclaimer, the term of this patent is extended or adjusted under 35 U.S.C. 154(b) by 879 days.

(21) Appl. No.: 11/546,946

(22) Filed: Oct. 12, 2006

(65) Prior Publication Data
US 2007/0096608 A1    May 3, 2007

(30) Foreign Application Priority Data
Oct. 12, 2005   (DE)   ............. 10 2005 048 831

(51) Int. Cl.
*H02B 1/32*   (2006.01)

(52) U.S. Cl. ............................ 312/265.6; 312/223.1

(58) Field of Classification Search ............. 312/257.1, 312/265.3, 265.4, 265.5, 265.6, 294, 304; 211/26; 174/50, 50.4, 58; 361/724, 725, 361/726, 727
See application file for complete search history.

(56) References Cited

U.S. PATENT DOCUMENTS

| | | | | | |
|---|---|---|---|---|---|
| 2,769,940 | A | * | 11/1956 | Pettit | 361/647 |
| 4,689,722 | A | * | 8/1987 | Debus et al. | 361/725 |
| 5,292,189 | A | * | 3/1994 | Lau et al. | 312/265.3 |
| 5,333,950 | A | * | 8/1994 | Zachrai | 312/265.1 |
| 5,388,903 | A | * | 2/1995 | Jones et al. | 312/334.29 |
| 5,536,079 | A | * | 7/1996 | Kostic | 312/265.3 |
| 5,769,519 | A | * | 6/1998 | Nicolai | 312/351.1 |
| 6,145,943 | A | * | 11/2000 | Reuter et al. | 312/223.1 |
| 6,155,660 | A | * | 12/2000 | Nicolai | 312/223.1 |
| 6,384,323 | B2 | * | 5/2002 | Elm et al. | 174/374 |
| 6,575,657 | B1 | * | 6/2003 | Reuter et al. | 403/231 |

FOREIGN PATENT DOCUMENTS

| | | |
|---|---|---|
| DE | 1 465 775 | 11/1969 |
| EP | 0901207 A1 * | 10/1999 |
| EP | 1164672 A1 * | 12/2001 |
| EP | 1587191 A1 * | 10/2005 |
| EP | 1587192 A1 * | 10/2005 |
| FR | 2 681 478 | 3/1993 |
| GB | 2335587 A1 * | 9/1999 |

* cited by examiner

*Primary Examiner*—Darnell M Jayne
*Assistant Examiner*—Michael Calabrese
(74) *Attorney, Agent, or Firm*—Pauley Petersen & Erickson

(57) ABSTRACT

A switchgear cabinet with a rack and/or panel elements, wherein a mounting plate can be attached to an interior of the switchgear cabinet. A lower edge of the mounting plate has sliding elements, wherein one or several spacing elements are fastened on a rear panel element and/or on rear parts of the rack, by which the mounting plate is supported in the mounting position. The mounting plate can provide fastening receivers in the area of the lower edge and the upper edge which, in the installation position of the mounting plate, cooperate with fastening elements of the lower and upper contact elements and fix the mounting plate rigidly in place. With sliding elements supported on the bottom or the cover plate and fastening elements at the spacing elements and fastening receivers on the mounting plate, an installation without sliding rails is possible, wherein the switchgear cabinet can be installed facing the attachment area with the bottom plate or the cover plate.

11 Claims, 5 Drawing Sheets

SWITCHGEAR CABINET WITH A RACK AND/OR PANEL ELEMENTS

BACKGROUND OF THE INVENTION

1. Field of the Invention

This invention relates to a switchgear cabinet with a rack and/or panel elements, wherein a mounting plate can be attached to an interior of the switchgear cabinet, the lower edge of the mounting plate has sliding elements, one or several spacing elements are fastened on a rear panel element and/or on rear parts of the rack, by which the mounting plate is supported in the mounting position, and the mounting plate has fastening receivers in the area of the lower edge and the upper edge which, in the installation position of the mounting plate, cooperate with fastening elements of the lower and upper contact elements and fix the mounting plate rigidly in place.

2. Discussion of Related Art

Switchgear cabinets can be embodied with or without a rack, wherein a switchgear cabinet interior, in which the mounting plate with the attachments are installed, is always enclosed by the panel elements. A distance from the parallel rear wall, which is predetermined by the spacing elements, is always maintained for safety reasons. In this case, the mounting plates can have a considerable weight and are thus hard to manipulate as far as the installation and access in case of supplementary and/or repair work is concerned.

As shown by German Patent Reference DE 1 465 775, bearing elements are applied in the area of the lower edge of the rear wall, into which the mounting plate could be inserted and pivotably seated. The mounting plate is also maintained in the area of the upper edge of the mounting plate on spacing elements by releasable connections. The installation of heavy mounting plates is not simplified by this embodiment. In case of supplementary or repair work, after releasing the upper connections the mounting plate can be put into an inclined position in which a rear portion of it is accessible.

Installation of the mounting plate in the interior of the switchgear cabinet has been made easier by providing a lower edge with sliding elements which are displaceably guided on guide rails on the bottom of the switchgear cabinet comprised of rack elements as is known in the art and, as shown in French Patent Reference FR 2 681 478 B1 seen in FIG. 5 labeled as prior art. In this case, spacing elements with a snap-in action are provided in the area of the lower edge and the upper edge of the mounting plate which, in the installed state, hold and secure the mounting plate. This embodiment requires at least two guide rails in every case, which must be fastened on the bottom plate or the facing area of the rack.

SUMMARY OF THE INVENTION

It is one object of this invention to provide a switchgear cabinet of the type mentioned above but in such a way that heavy mounting plates can be installed in the switchgear cabinet interior with little technical outlay, wherein add as an additional advantage, the switchgear cabinet can be selectively placed facing the attachment area either with the bottom plate or the cover plate.

In accordance with this invention, this object is achieved by introducing the mounting plate into the switchgear cabinet interior. The sliding elements are supported with a sliding face on an interior surface of a bottom plate and cover plate of the switchgear cabinet facing the switchgear cabinet interior and are guided on it, wherein the bottom plate or the cover plate faces the attachment area.

The arrangement of fastening receivers at the lower edge and the upper edge, as well as the use of spacing elements with fastening elements in the facing lower or upper area of the rear wall, allows the two placement variations of the switchgear cabinet. This fastening results in an unequivocal installation position with a fixation which cannot be displaced in the direction toward the lateral walls. The sliding elements on the lower edge of the mounting plate and their guidance on the bottom plate or the cover plate render guide rails superfluous. Fixation of the lower edge at the facing spacing elements is taken over by the receiving grooves of the spacing elements, which assure fixation without possible displacement of the mounting plate, perpendicularly with respect to the rear wall. Also, in the installed position the mounting plate can be permanently fixed in place, which can be designed in a known manner, or which can also be accomplished according to this invention by an appropriate layout of the fastening elements.

So that during the installation of the mounting plate the sliding elements do not hamper the lateral fastening of the mounting plate by the fastening receivers and the fastening elements, in accordance with one embodiment, the sliding elements are placed onto the mounting plate outside of the fastening receivers of the lower edge, and the sliding elements can be removed from the lower edge of the mounting plate after attaining the installed position.

It is possible, in accordance with one embodiment, for the fastening receivers to be on the lower edge and the upper edge and embodied as vertical recesses of the mounting plate, which are matched in the horizontal direction to the dimensions of bolts designed as fastening elements of the spacing elements. The fastening elements of the spacing elements can be embodied as threaded bolts, onto which screw elements can be screwed for fixing the mounting plate, which is in the installed position, in place.

In accordance with one embodiment, the insertion of the lower edge of the mounting plate into the receiving grooves of the spacing elements is achieved if the sliding elements guide the lower edge of the mounting plate at a distance from the bottom plate or the cover plate so that, following the placement of the mounting plate against the lower or upper spacing elements, the lower edge is located above the receiving grooves of the facing spacing elements. Following the removal of the sliding elements, the mounting plate can be lowered and introduced with the lower edge into the receiving grooves of the facing spacing elements. In this case, the removal of the sliding elements can be made easier if during the removal the sliding elements are shifted into laterally arranged enlarged recesses of the lower edge, which permit the insertion of the lower edge into the sliding element.

When aligning the cover plate of the switchgear cabinet with the attachment area, the installation of the mounting plate can be made easier if the upper spacing elements are provided with a ramping support in the area of the cover plate which, when introducing the upper edge of the mounting plate into the lower spacing elements in the area of the bottom plate, lift the mounting plate into the installation position. With the introduction of the fastening elements of the spacing elements in the area of the cover plate into the fastening receivers of the lower edge of the mounting plate, the vertical installation position of the mounting plate is fixed and the removal of the sliding elements is made possible. If the mounting plate with the sliding elements is supported on the bottom plate by a cable introduction opening, in connection with a bottom plate with a cable introduction opening and an upwardly beveled L-shaped edge, the sliding elements on the lower edge of the mounting plate slide on the edge and additionally enter the cable introduction opening with a shoulder and are laterally guided on the edge.

BRIEF DESCRIPTION OF THE DRAWINGS

This invention is explained in greater detail in view of an exemplary embodiment, making reference to the drawings, wherein.

DETAILED DESCRIPTION OF THE INVENTION

Figure 1:
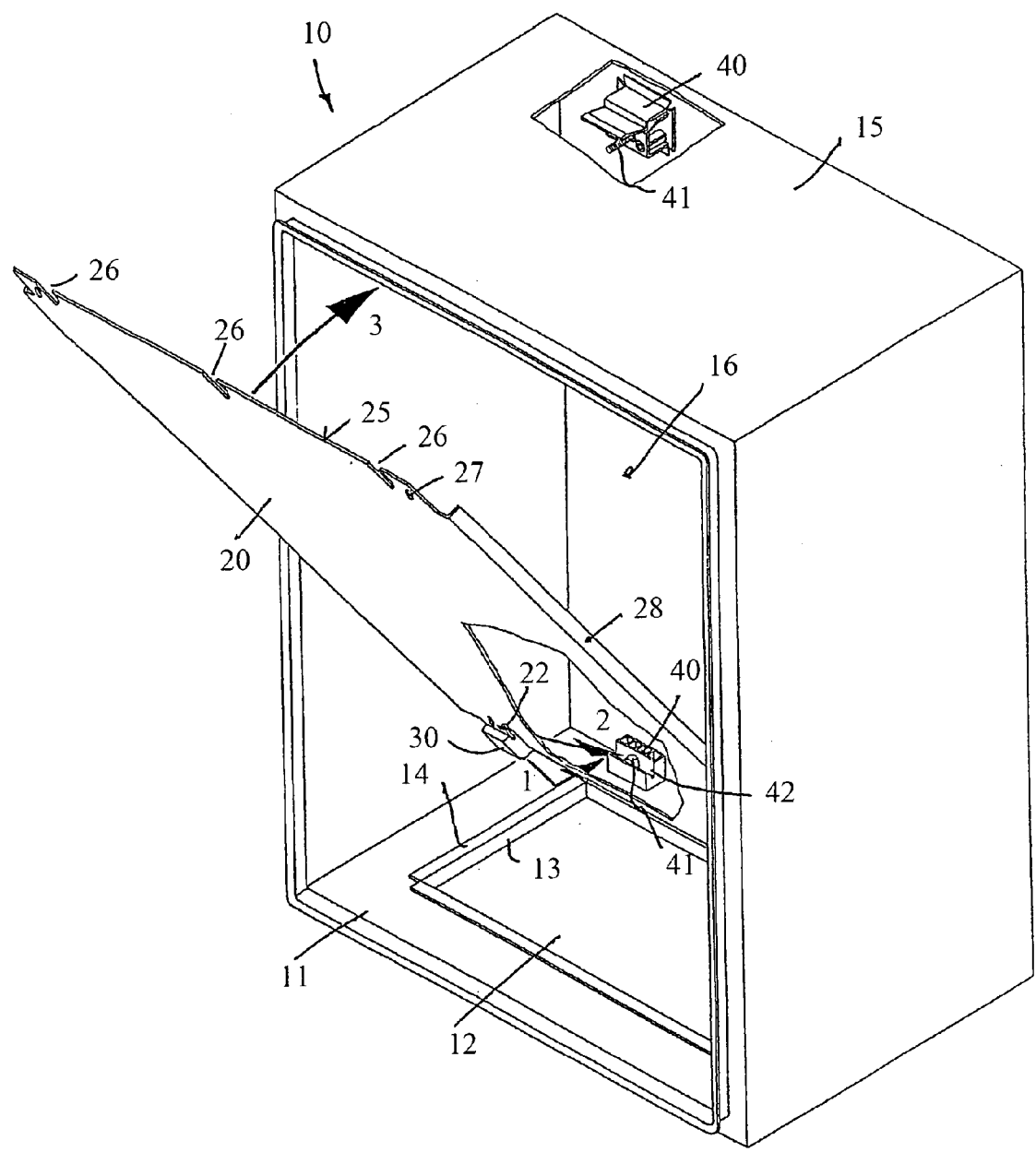
FIG. 1 is a perspective front view of a switchgear cabinet, into which a mounting plate is installed, wherein a bottom plate has a cable introduction opening and faces the attachment area.

The switchgear cabinet 10 represented in FIG. 1 is constructed without a rack. The bottom plate 11, the cover plate 15, the rear wall 16 and the lateral walls 17 and 18 enclose the switchgear cabinet interior, in which the mounting plate 20 can be installed spaced apart from the rear wall 16. The bottom plate 11 has a cable introduction opening 12, off of which an L-shaped edge with edge sections 13 and 14 is beveled. The L-shaped edge faces the interior of the switchgear cabinet 10. A cabinet door, not represented, is attached in the area of or near the open front side.

Spacing elements 40 are attached in the lower and upper area of the rear wall 16, which form a stop when the mounting plate 20 is installed and thus determine a distance to the rear wall 16.

At the lower edge 21 and the upper edge 25, the mounting plate 20 has fastening receivers 22 and 26, which are designed as recesses.

Figure 2:
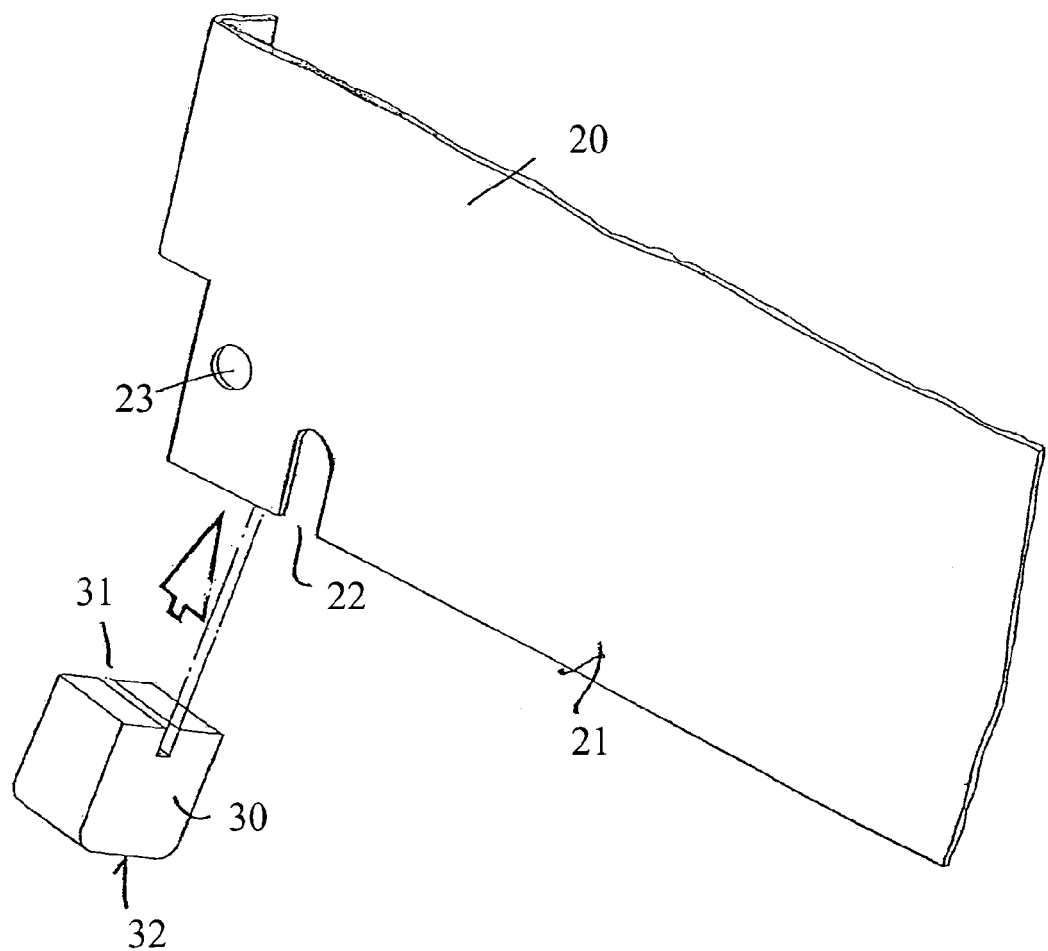
FIG. 2 is a partial perspective view of the mounting plate with a fastening receiver of a lower edge and sliding element, which can be placed on it.

The spacing elements 40 have fastening elements 41 in the shape of protrusions, such as bolts at the top or shoulders at the bottom, which can be embodied as threaded bolts. The fastening receivers 22 and 26 have a horizontal width corresponding to a diameter of the fastening elements 41. As FIG. 2 shows, sliding elements 30 are placed on the lower edge 21 of the mounting plate 20, wherein the lower edge 21 are introduced into the transverse slits 31 of the sliding elements 30. The sliding elements 30 have sliding faces 32 facing the edge section 14 of the bottom plate 12, on which the bottom plate 20 is supported and pushed into the switchgear cabinet interior in the direction toward the rear wall 16, as indicated by the reference numeral "1" in FIG. 1. During this the fastening element 41 of the two lower spacing elements 40 is introduced into the fastening receivers 22, of the mounting plate 20, as indicated by the reference numeral "2" in FIG. 1.

In this case, two sliding elements 30 and two spacing elements 40 with fastening elements 41 are preferably provided. However, more than two fastening locations can be provided, as indicated by the fastening receivers 26 at the upper edge 25 of the mounting plate 20. The mounting plate 20 can have additional fastening receivers 23 and 27. Also, the vertical sides of the mounting plate 20 can be reinforced by bevels 28.

Once the lower edge 21 of the mounting plate 20 reaches the contact position at the lower spacing elements 40, it is pivoted against the upper spacing elements 40, as the reference numeral "3" in FIG. 1 shows. The fastening elements 41 designed as threaded bolts of the upper spacing elements 40 engage the fastening receivers 26.

When raising the mounting plate 20, the lower edge 21 engages the receiving grooves 42 of the lower spacing elements 40. The mounting plate 20, supported here by the occurring lever forces, is lifted opposite the direction of gravity, and the sliding elements 30 are lifted off the bottom plate 12.

The sliding elements 30 can then be removed from the lower edge 21. If the fastening elements 41 of the spacing elements 40 are embodied as threaded bolts, the installation position can be fixed by screw elements screwed onto them.

Figure 3:
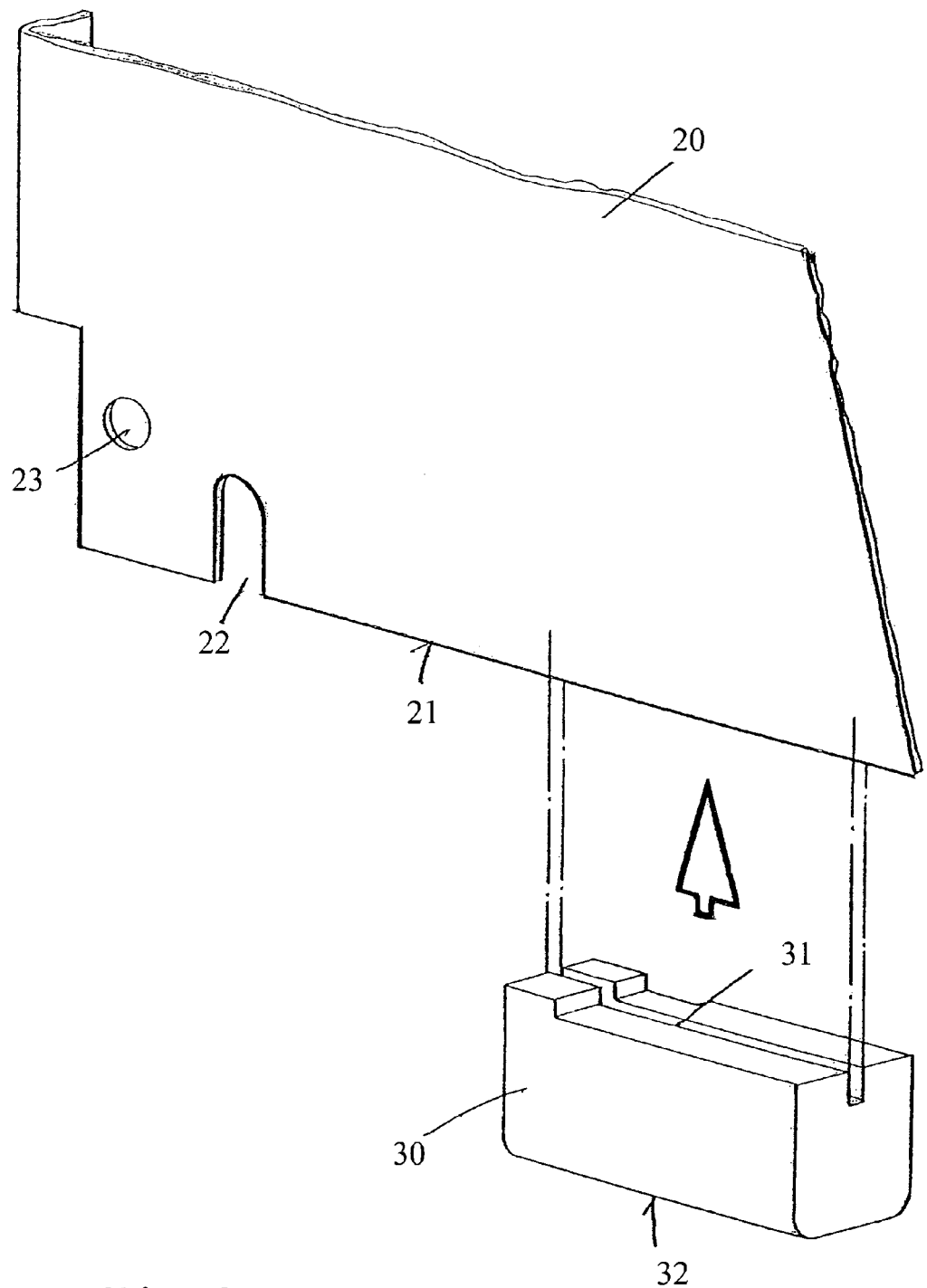
FIG. 3 is a partial view corresponding to FIG. 2 with a different sliding element and a different attachment to the lower edge of the mounting plate.

As FIG. 3 shows, if a closed bottom plate 11 forms the support for the sliding face 32, the lower edge 21 of the mounting plate 20 can also support only one centered, wide sliding element 30.

Figure 4:
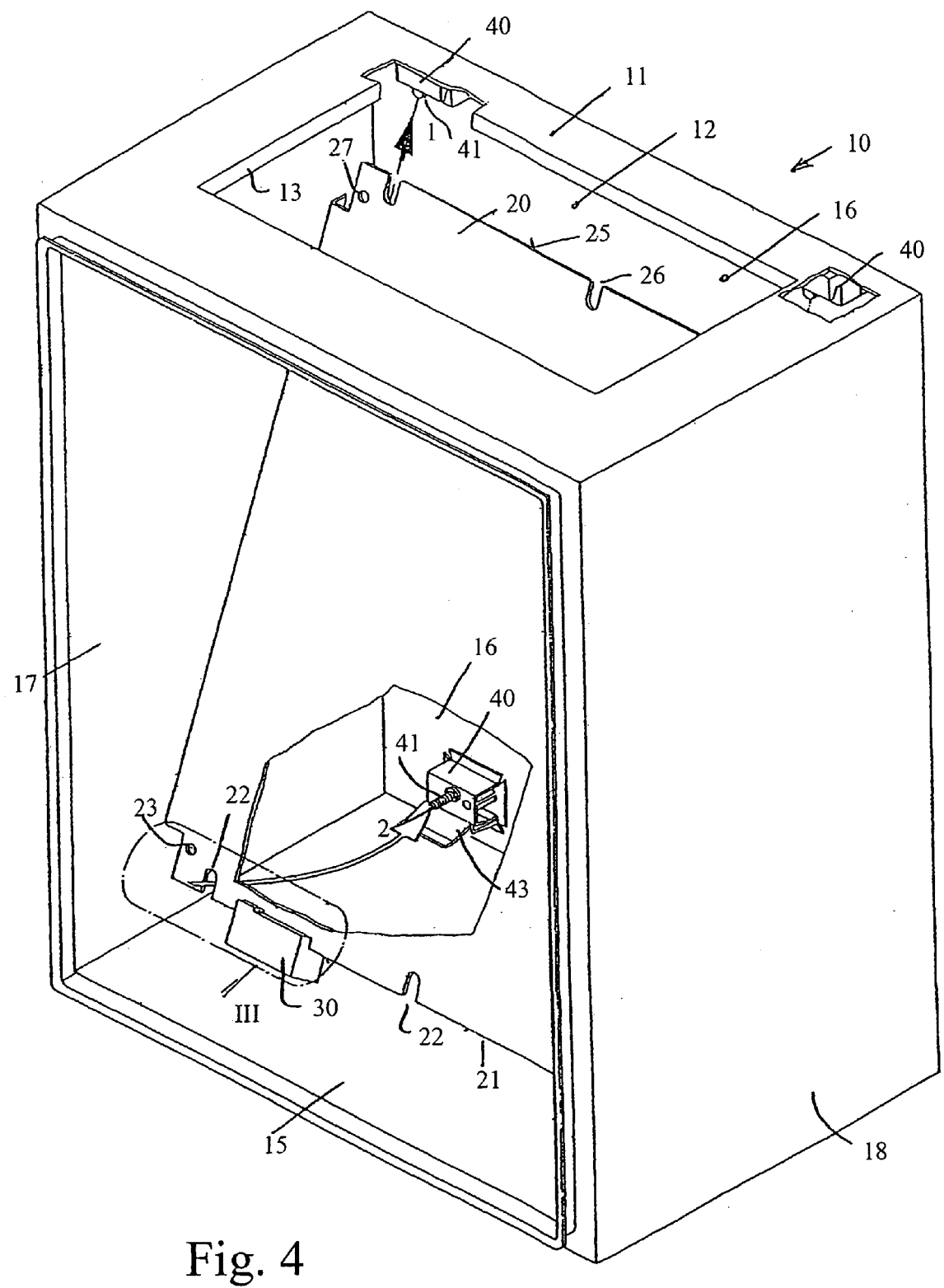
FIG. 4 shows the switchgear cabinet in accordance with FIG. 1 in a front perspective view, wherein the cover plate is facing the attachment area and the mounting plate is shown during introduction into the switchgear cabinet interior.
Figure 5:
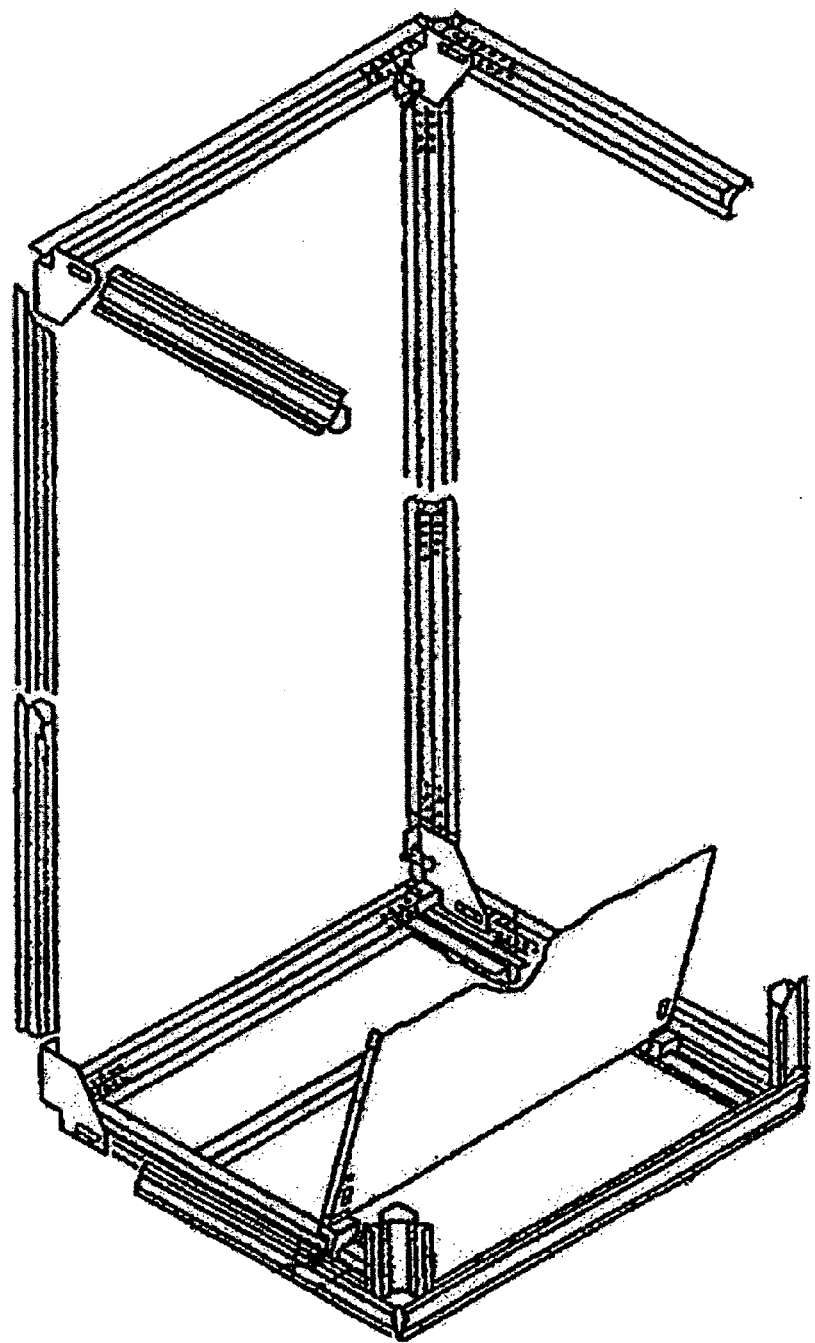
FIG. 5 shows a prior art switchgear cabinet comprised of rack elements.

Furthermore, the spacing elements 40 can also have ramping supports 43 which, during introducing the upper edge 26 into the receiving grooves 42 of the spacing elements 40 in the area of the bottom plate 11, determine the final installed position, as shown in FIG. 4, in which the cover plate 15 of the switchgear cabinet 10 faces the attachment area.

Here, the installation process occurs in three steps, of which the first step is indicated by the reference numeral "1" in FIG. 4. Fixation in the lateral direction is again taken up by the fastening receivers 26 and 22, as well as the fastening elements 41 of the spacing elements 40. The sliding element 30 is supported on the cover plate 15, and the lower edge 21 of the mounting plate 20 is lifted so far in the course of running up on the ramping support 43, that the sliding element 30 can be taken off or removed. The fastening elements 41 of the spacing elements 40 engaging the fastening receivers 22 in the area of the cover plate 15 maintain the installed position, and therefore the introduction of the upper edge 26 of the mounting plate 20 into the receiving grooves 42 of the spacing elements 40 in the area of the bottom plate 11, which can have the cable introduction opening 12 for introducing the cables from above.

A distance of the lower edge 21 from the bottom plate 11 or the cover plate 15 is determined by the sliding elements 30 placed on the lower edge 21 of the mounting plate 20, so that it lies above the receiving groove 42 of the spacing elements 40 and, following the removal of the sliding elements 30, eases the introduction of the lower edge 21 into the receiving grooves 42 of the spacing elements 40.

German Patent Reference 10 2005 048 831.5-34, the priority document corresponding to this invention, and its teachings are incorporated, by reference, into this specification.

What is claimed is:

1. A switchgear cabinet with at least one of a rack and panel elements, wherein a mounting plate is attachable to an interior of the switchgear cabinet, a lower edge of the mounting plate having sliding elements, at least one upper spacing element and at least one lower spacing element, fastened on at least one of a rear panel of the panel elements and on a rear part of the rack, by which the mounting plate is supported in a mounting position, and the mounting plate provides fastening receivers in each of an area of the lower edge and an area of the upper edge of the mounting plate which in an installed position of the mounting plate cooperate with fastening elements of the at least one upper spacing element and at least one lower spacing element and fix the mounting plate rigidly in place, the switchgear cabinet comprising:

while introducing the mounting plate (20) into the switchgear cabinet interior the sliding elements (30) are guided and supported with a sliding face (32) on an interior surface of a bottom plate (11) of the switchgear cabinet facing the switchgear cabinet interior, and the sliding elements (30) guiding the lower edge (21) of the mounting plate (20) at a distance from the bottom plate (11) so that following placement of the mounting plate (20) against the at least one lower spacing element (40), the lower edge (21) is positioned above a receiving groove (42) of the at least one lower spacing element (40), and following removal of the sliding elements (30), the mounting plate (20) is lowered and introduced with the lower edge (21) into the receiving groove (42).

2. The switchgear cabinet in accordance with claim 1, wherein the receiving groove (42) of the at least one lower spacing element (40) extends parallel with rear panel (16) and receives the lower edge (21) of the mounting plate (20) in the installed position, and the lower edge (21) fixed in place against the at least one lower spacing element (40).

3. The switchgear cabinet in accordance with claim 2, wherein the sliding elements (30) are placed on the mounting plate (20) outside of the fastening receivers (22) in the area of the lower edge (21), and the sliding elements (30) are removable from the lower edge (21) of the mounting plate (20) after the mounting position is reached.

4. The switchgear cabinet in accordance with claim 3, wherein the fastening receivers (22, 26) in the area of the lower edge (21) and in the area of the upper edge (25) are recesses of the mounting plate (20) which are matched to dimensions of the fastening elements (41) each formed as a protrusion of the at least upper one and at least one lower spacing elements (40).

5. The switchgear cabinet in accordance with claim 4, wherein the fastening element of the at least one upper spacing element (40) comprises a threaded bolt for fixing the mounting plate (20) in place when in the installed position.

6. The switchgear cabinet in accordance with claim 5, wherein during removal, the sliding elements (30) are displaceable on the lower edge (21) of the mounting plate (20) into laterally arranged enlarged recesses of the lower edge (21), which release an engagement of the lower edge (21) with the sliding elements (30).

7. The switchgear cabinet in accordance with claim 1, wherein the sliding elements (30) are placed on the mounting plate (20) outside of the fastening receivers (22) in the area of the lower edge (21), and the sliding elements (30) are removable from the lower edge (21) of the mounting plate (20) mounting position is reached.

8. The switchgear cabinet in accordance with claim 1, wherein the fastening receivers (22, 26) in the area of the lower edge (21) and in the area of the upper edge (25) are recesses of the mounting plate (20) which are matched to dimensions of the fastening elements (41) each formed as a protrusion of the at least one upper and at least one lower spacing elements (40).

9. The switchgear cabinet in accordance with claim 8, wherein the fastening element of the at least one upper spacing element (40) comprises a threaded bolt for fixing the mounting plate (20) in place when in the installed position.

10. A switchgear cabinet with one of a rack and panel elements, wherein a mounting plate is attachable to an interior of the switchgear cabinet, a lower edge of the mounting plate having sliding elements, at least one upper spacing element and at least one lower spacing element is fastened on one of a rear panel of the panel elements and on a rear part of the rack, by which the mounting plate is supported in a mounting position, and the mounting plate provides fastening receivers in each of an area of the lower edge and an area of the upper edge of the mounting plate which in an installed position of the mounting plate cooperate with fastening elements of the at least one upper and at least one lower spacing element and fix the mounting plate rigidly in place, the switchgear cabinet comprising:

while introducing the mounting plate (20) into the switchgear cabinet interior the sliding elements (30) are guided and supported with a sliding face (32) on an interior surface of a cover plate (15) of the switchgear cabinet facing the switchgear cabinet interior, the at least one upper spacing element (40) disposed near the cover plate (15) having a ramping support (43) which, when introducing the upper edge (25) of the mounting plate (20) into the at least one lower spacing element (40) disposed near the bottom plate (11), lifts the mounting plate (20) into the installed position, and when introducing the fastening elements (41) of the at least one upper spacing element (40) disposed near the cover plate (15) into the fastening receivers (22) in the area of the lower edge (21) of the mounting plate (20), a vertical installation position of the mounting plate (20) is fixed and the sliding elements (30) are removable.

11. The switchgear cabinet in accordance with claim 10, wherein during removal the sliding elements (30) are displaceable on the lower edge (21) of the mounting plate (20) into laterally arranged enlarged recesses of the lower edge (21), which release an engagement of the lower edge (21) with the sliding elements (30).

* * * * *